US007995098B2

(12) United States Patent
Pedeville et al.

(10) Patent No.: US 7,995,098 B2
(45) Date of Patent: Aug. 9, 2011

(54) SYSTEMS AND METHODS FOR MEASURING SPATIAL AND ANGULAR PERFORMANCE OF A VISUAL DISPLAY

(75) Inventors: Gary Robert Pedeville, Duvall, WA (US); Ronald F. Rykowski, Woodinville, WA (US)

(73) Assignee: Radiant Imaging, Inc., Duvall, WA (US)

( * ) Notice: Subject to any disclaimer, the term of this patent is extended or adjusted under 35 U.S.C. 154(b) by 1276 days.

(21) Appl. No.: 11/519,546

(22) Filed: Sep. 11, 2006

(65) Prior Publication Data

US 2007/0058044 A1    Mar. 15, 2007

Related U.S. Application Data

(60) Provisional application No. 60/715,447, filed on Sep. 9, 2005, provisional application No. 60/720,224, filed on Sep. 23, 2005.

(51) Int. Cl.
*H04N 17/00* (2006.01)
*H04N 17/02* (2006.01)
*H04N 3/14* (2006.01)
*H04N 3/12* (2006.01)
*H04N 5/66* (2006.01)
*H04N 9/12* (2006.01)

(52) U.S. Cl. ........ 348/190; 348/177; 348/180; 348/184; 348/790; 348/795; 348/797

(58) Field of Classification Search .......... 348/177–178, 348/180, 184, 189, 790, 795, 797; 702/67; 324/770
See application file for complete search history.

(56) References Cited

U.S. PATENT DOCUMENTS

| | | | | |
|---|---|---|---|---|
| 5,510,833 A * | 4/1996 | Webb et al. | ................... | 348/190 |
| 5,532,765 A * | 7/1996 | Inoue et al. | ................... | 348/807 |
| 5,638,461 A * | 6/1997 | Fridge | ........................... | 382/141 |
| 5,657,079 A * | 8/1997 | Thario et al. | ................... | 348/190 |
| 5,739,809 A * | 4/1998 | McLaughlin et al. | ........ | 345/594 |
| 5,764,209 A * | 6/1998 | Hawthorne et al. | ............. | 345/87 |
| 5,850,472 A * | 12/1998 | Alston et al. | .................. | 382/162 |
| 6,020,919 A * | 2/2000 | Fujii et al. | ...................... | 348/190 |
| 6,177,955 B1* | 1/2001 | Downen et al. | ............... | 348/189 |
| 6,392,657 B1* | 5/2002 | Hilliard et al. | ................ | 345/589 |
| 6,558,006 B2* | 5/2003 | Ioka | ............................... | 353/94 |
| 6,606,116 B1* | 8/2003 | Poynter | ........................ | 348/189 |
| 6,628,555 B2* | 9/2003 | Kondo et al. | ............ | 365/189.09 |
| 6,717,625 B1* | 4/2004 | Thielemans | .................. | 348/745 |
| 6,838,659 B2* | 1/2005 | Kanai | ........................... | 250/226 |
| 6,982,744 B2 | 1/2006 | Jenkins | | |
| 6,987,244 B2* | 1/2006 | Bauer | ...................... | 219/137.31 |
| 7,012,633 B2* | 3/2006 | Jenkins | ........................ | 348/180 |
| 7,136,056 B2* | 11/2006 | Lee et al. | ....................... | 345/207 |
| 7,136,076 B2* | 11/2006 | Evanicky et al. | ............. | 345/600 |
| 7,170,550 B2* | 1/2007 | Yamakawa | .................... | 348/189 |
| 7,215,362 B2* | 5/2007 | Klose | ........................... | 348/189 |

(Continued)

*Primary Examiner* — Brian Yenke
(74) *Attorney, Agent, or Firm* — Perkins Coie LLP (57) ABSTRACT

Systems and methods for measuring spatial and angular performance of a visual display are disclosed herein. In one particular embodiment, for example, a method for measuring spatial and angular performance of a flat panel visual display includes capturing a plurality of image measurements from a visual display at a plurality of different view angles. The method also includes selecting one or more points of interest on the visual display, and calculating tristimulus values (X, Y, Z) for each point of interest at each of the plurality of view angles. The method further includes generating a view angle performance plot for the one or more selected points of interest.

19 Claims, 5 Drawing Sheets

U.S. PATENT DOCUMENTS

| | | | |
|---|---|---|---|
| 7,242,384 B2 * | 7/2007 | Yamamoto et al. | 345/102 |
| 7,380,176 B2 * | 5/2008 | Tseng | 714/46 |
| 7,415,153 B2 * | 8/2008 | Mojsilovic | 382/162 |
| 7,479,982 B2 * | 1/2009 | Otani et al. | 348/188 |
| 7,643,061 B2 * | 1/2010 | Yamagishi | 348/207.99 |
| 7,646,397 B2 * | 1/2010 | Karaki | 345/690 |
| 7,667,734 B2 * | 2/2010 | Uehara | 348/177 |
| 2003/0193564 A1 * | 10/2003 | Jenkins | 348/182 |
| 2005/0073530 A1 * | 4/2005 | Kapur et al. | 345/594 |
| 2006/0187362 A1 * | 8/2006 | Uehara | 348/790 |
| 2009/0185173 A1 * | 7/2009 | Ashdown et al. | 356/121 |
| 2009/0311939 A1 * | 12/2009 | Elliott | 445/3 |

* cited by examiner

Spatial Luminance Non-Uniformity vs. View-Angle
Using 9 Points-Of-Interest

*Fig. 4B*

Color Difference ($\Delta u'v'$) vs. View-Angle Relative to Normal View-Angle
At Center Point-Of-Interest

*Fig. 4C*

SYSTEMS AND METHODS FOR MEASURING SPATIAL AND ANGULAR PERFORMANCE OF A VISUAL DISPLAY

CROSS-REFERENCE TO RELATED APPLICATION

The present application claims priority to pending U.S. Provisional Application No. 60/715,447, filed Sep. 9, 2005, and U.S. Provisional Application No. 60/720,224, filed Sep. 23, 2005, both of which are incorporated herein in their entirety by reference.

TECHNICAL FIELD

The present disclosure is related generally to systems and methods for measuring spatial and angular performance of a visual display.

BACKGROUND

Flat panel video displays, such as plasma televisions, LCD displays, and the like, are becoming very popular. As a result, flat panel video displays are used in a wide variety of viewing areas from family rooms to boardrooms. Many manufacturers are accordingly entering into this segment of the market with many different models of video displays that have different shapes and sizes.

It is often desired to measure the view angle performance and total light (e.g., the total luminous flux) emitted by such video displays in order to characterize each display's performance. One conventional process for measuring visual displays includes taking "spot" measurements with a spectroradiometer or other suitable spot meter at a number of different portions of the display. During such measurements, it is possible to measure view angle performance by rotating or moving the visual display relative to the spectroradiometer. A number of separate spot measurements can be taken of various points on the visual display to approximate the view angle performance of the particular display. Although this conventional approach can generally provide the necessary measurement(s) with a sufficient degree of accuracy, this process is far too slow for production applications. Furthermore, this method requires an assumption that the visual display under test is spatially uniform (i.e., has a uniform brightness and color across the entire display). Most displays, however, are not spatially uniform. For research and development applications, often a high amount of spatial resolution is required. This type of measurement is impractical because of the enormous amount of time that would be required using a spot measurement device to measure thousands of locations on the visual display. Accordingly, there is a need to improve the systems and methods for measuring spatial and angular performance of visual displays.

DETAILED DESCRIPTION

A. Overview

The present disclosure describes systems and methods for measuring spatial and angular performance of a visual display. In one particular embodiment, for example, a method for measuring spatial and angular performance of a flat panel visual display includes capturing a plurality of image measurements from a visual display at a plurality of different view angles. The method also includes selecting one or more points of interest on the visual display, and calculating tristimulus values (X, Y, Z) for each point of interest at each of the plurality of view angles. The method further includes generating a view angle performance plot for the one or more selected points of interest.

Another embodiment of the invention is directed to a system for measuring spatial and angular performance of a flat panel visual display. The system includes a camera (e.g., an imaging photometer) and a flat panel visual display positioned relative to the camera for measurement. The system also includes a display support assembly (e.g., a goniometer) carrying the visual display and configured to rotatably move the visual display relative to the camera. The system further includes a controller operably coupled to the camera and the display support assembly. The controller has a computer-readable medium containing instructions to perform a method comprising (a) capturing a plurality of image measurements from the visual display at a plurality of different view angles with the camera, (b) creating a list of user-selected points of interest on the visual display, (c) calculating tristimulus values (X, Y, Z) for the individual point of interests at each of the view angles, and (d) generating one or more a view angle performance charts for the selected points of interest.

Many specific details of certain embodiments of the invention are set forth in the following description and in FIGS. 1A-4C to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 1A:
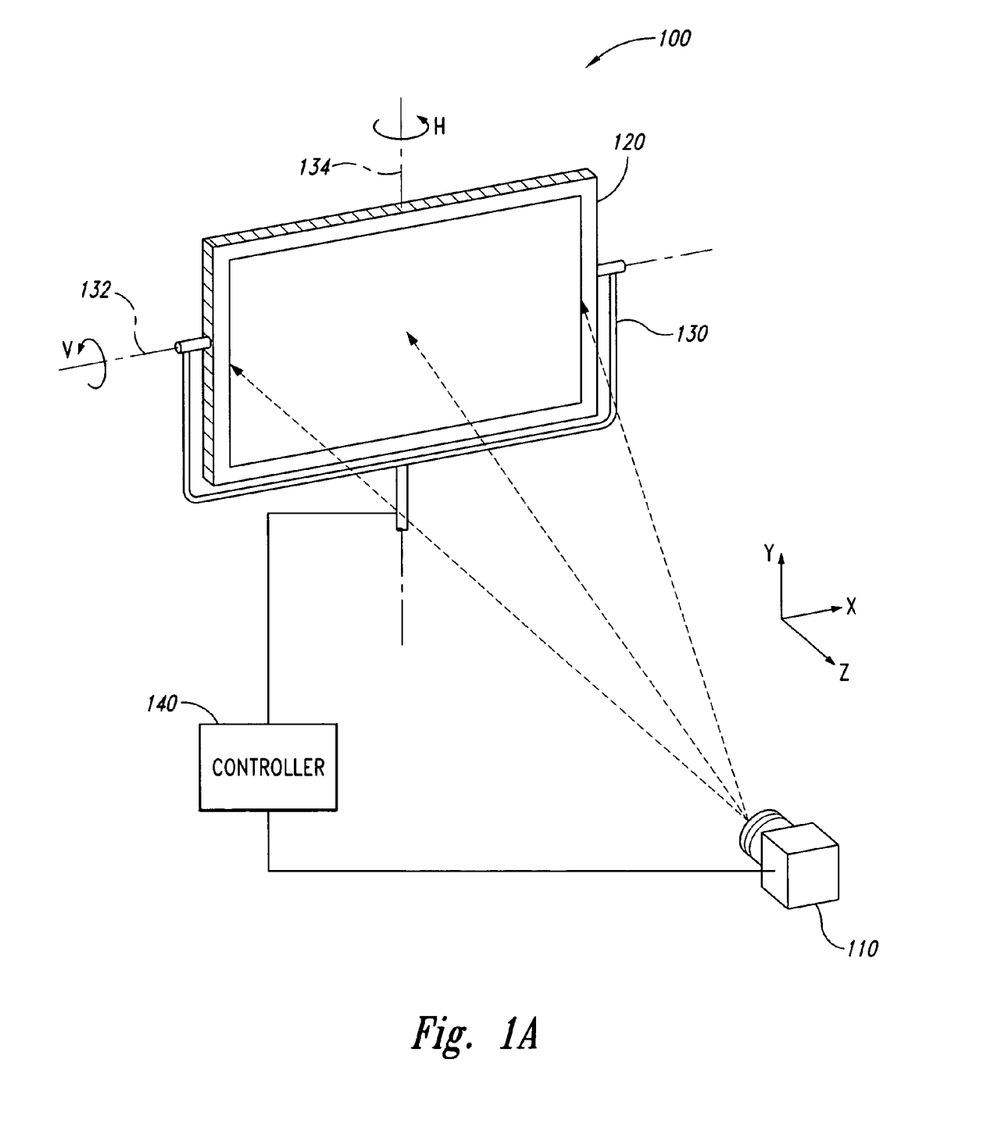
FIG. 1A is a partially schematic, isometric view of a visual display calibration system for measuring spatial and angular performance of a visual display in accordance with several embodiments of the invention.

B. Embodiments of Systems and Methods for Measuring Spatial and Angular Performance of a Visual Display FIG. 1A is a partially schematic, isometric view of a visual display calibration system 100 for measuring spatial and angular performance of a visual display in accordance with several embodiments of the invention. The system 100 includes a camera or imaging photometer 110, a flat panel visual display or other light source 120 positioned for measurement, and a display support assembly 130 configured to move the visual display 120 relative to the imaging photometer 110. The display support assembly 130 is configured to allow the entire visual display 120 to be measured without moving or otherwise repositioning the imaging photometer 110. The system 100 also includes a controller 140 (shown schematically) operably coupled to the imaging photometer 110 and configured to control the relative movement of the visual display 120 via the display support assembly 130 such that any number of points on the visual display 120 can be tested by the imaging photometer 110. The controller 140 is also configured to control operation of the imaging photometer 110 and process test data. The system 100 is configured to take measurements of the visual display 120 from multiple view angles and combine these measurements to generate view angle performance (e.g., spatial and angular characterizations of display performance) for any point on the visual display 120.

The imaging photometer 110 is positioned at a desired distance from the visual display 120 and configured to capture one or more image measurements from the visual display 120. The distance between the imaging photometer 110 and the visual display 120 can vary depending on the size of the visual display 120 and the configuration of the imaging photometer 110. In several embodiments, the imaging photometer 110 can include a CCD digital camera. Suitable CCD-based digital cameras include the ProMetric® series imaging photometers and/or calorimeters, which are commercially available from the assignee of the present application, Radiant Imaging of Duvall, Wash. In other embodiments, however, other CCD-based or CMOS-based digital cameras may be used.

The display support assembly 130 can include a goniometer configured to rotatably move the visual display 120 about a first axis or horizontal axis 132 (as shown by the arrow H) and a second axis or vertical axis 134 generally transverse to the first axis 132 (as shown by the arrow V). The arrangement illustrated in FIG. 1A is often referred to as an East Polar goniometric coordinate system. As described in detail below, the coordinates of particular points on the screen can be expressed in a number of ways. In the illustrated embodiment, the display support assembly 130 can support a visual display 120 having a horizontal dimension up to about 1.7 meters and a vertical dimension up to about 1.0 meters. In addition, the display support assembly 130 includes +/−88° azimuth and polar capabilities. In other embodiments, the display support assembly 130 can have a different configuration and/or include different features. For example, the display support assembly 130 can have a different size and/or arrangement based on the size of the visual display 120 under test.

As mentioned above, the controller 140 is operably coupled to the imaging photometer 110 to receive and process the image data captured from the visual display 120. The controller 140, for example, can include image software to extract the brightness and color data (i.e., luminance $L_v$ and chromaticity coordinates ($C_x$, $C_y$), respectively) from the image data. The controller 140 can also include a database to store image data and view angle performance data. Suitable image software for the controller 140, such as ProMetric® 8.5 software, is commercially available from Radiant Imaging. Methods for using the image software to measure view angle performance of the visual display 120 are discussed in more detail below.

In operation, the system 100 is configured to obtain complete or at least generally complete spatial and angular characterizations of display performance (e.g., luminance, chromaticity, uniformity, Δu'v', color-luminance difference, and/or contrast ratio) at a number of different viewing angles without having to move or recalibrate the imaging photometer 110. In the illustrated embodiment, for example, the visual display 120 is at a first position with a first angle relative to the imaging photometer 110. The visual display 120 can be pivoted or rotatably moved (as shown by the arrow H and V) to any number of different positions relative to the imaging photometer 110, and the system 100 can measure any number of points (i.e., points of interest or test points) on the visual display 120 regardless of the relative viewing angle between the visual display 120 and the imaging photometer 110. One advantage of this feature is that the system 100 can substantially improve the speed and efficiency of measuring view angle performance of visual displays as compared with conventional systems that use spectroradiometers or other types of spot meters to measure single points on the visual display.

Figure 2:
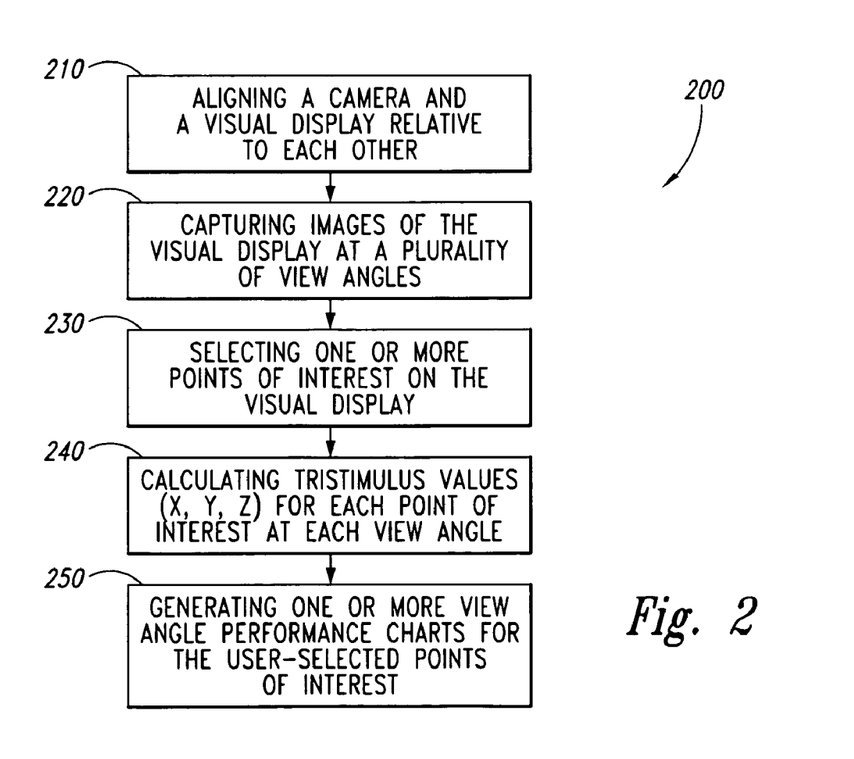
FIG. 2 is a flowchart illustrating various stages of a method for measuring spatial and angular performance of a visual display in accordance with several embodiments of the invention.

FIG. 2 is a flowchart illustrating various stages of a method 200 for measuring spatial and angular performance of a visual display in accordance with several embodiments of the invention. The method 200 can be performed, for example, using the system 100 described above with reference to FIG. 1A or other suitable systems. At stage 210, the method 200 includes aligning a camera (e.g., the imaging photometer 110) and a visual display (e.g., the flat panel visual display 120) carried by a goniometer or other suitable display support assembly relative to each other. For example, the camera can be directed at a center of the goniometer's rotation and the visual display can be aligned such that it is generally normal to the camera. This is a so-called "zero-zero" position. The locations of the camera and the visual display relative to each other are then measured and recorded. More specifically, the distance from the camera to the center of the goniometer rotation, the distance from the surface of the visual display to the center of the goniometer rotation, and the size of the display viewed by the camera are recorded. In other embodiments, other measurements can be taken and recorded in addition to, or in lieu of, these particular measurements.

Figure 1B:
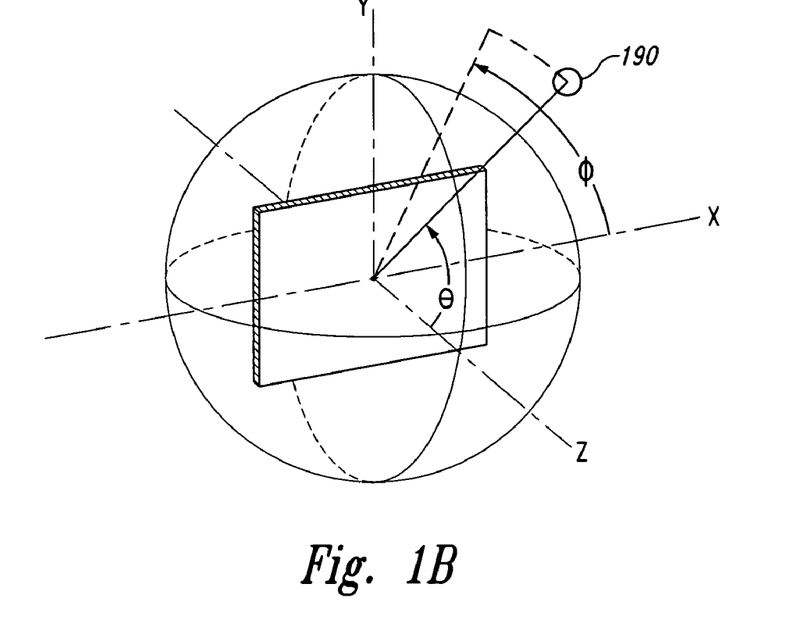
FIG. 1B is a diagram of a spherical coordinate system.

At stage 220, the method 200 includes capturing images of the visual display at a plurality of different view angles. In one embodiment, for example, this process can include selecting a desired step size (e.g., approximately 1°-10°) and stepping the goniometer about both the H axis and the V axis (FIG. 1A) to take the desired measurements. Although the goniometer's position is generally given with reference to the H and V axes, each measured view angle can also recorded using spherical view angle equivalents. These are referred to herein as the azimuth (Φ) and inclination (Θ) view angles. FIG. 1B, for example, is a diagram of a spherical coordinate system. A location of a camera or observer relative to the display is illustrated as sphere 190. The inclination view angle Θ is measured directly from an axis normal to the display surface (i.e., the inclination from the z-axis). The azimuth view angle Φ is the angle the projection of the view angle vector into the display surface makes with an axis defined in the plane of the display surface (i.e., the counter-clockwise angle from the x-axis in the x-y plane of the display surface as observed from the z-axis). The measured view angles can be transformed from H, V coordinates to spherical coordinates Θ, Φ using the following formulas:

$$\Theta = \arccos(\cos V \cos H)$$

$$\Phi = \arctan(\sin V \tan H)$$

In other embodiments, the step sizes can be different and/or the view angles can be characterized using different coordinate systems.

Figure 3:
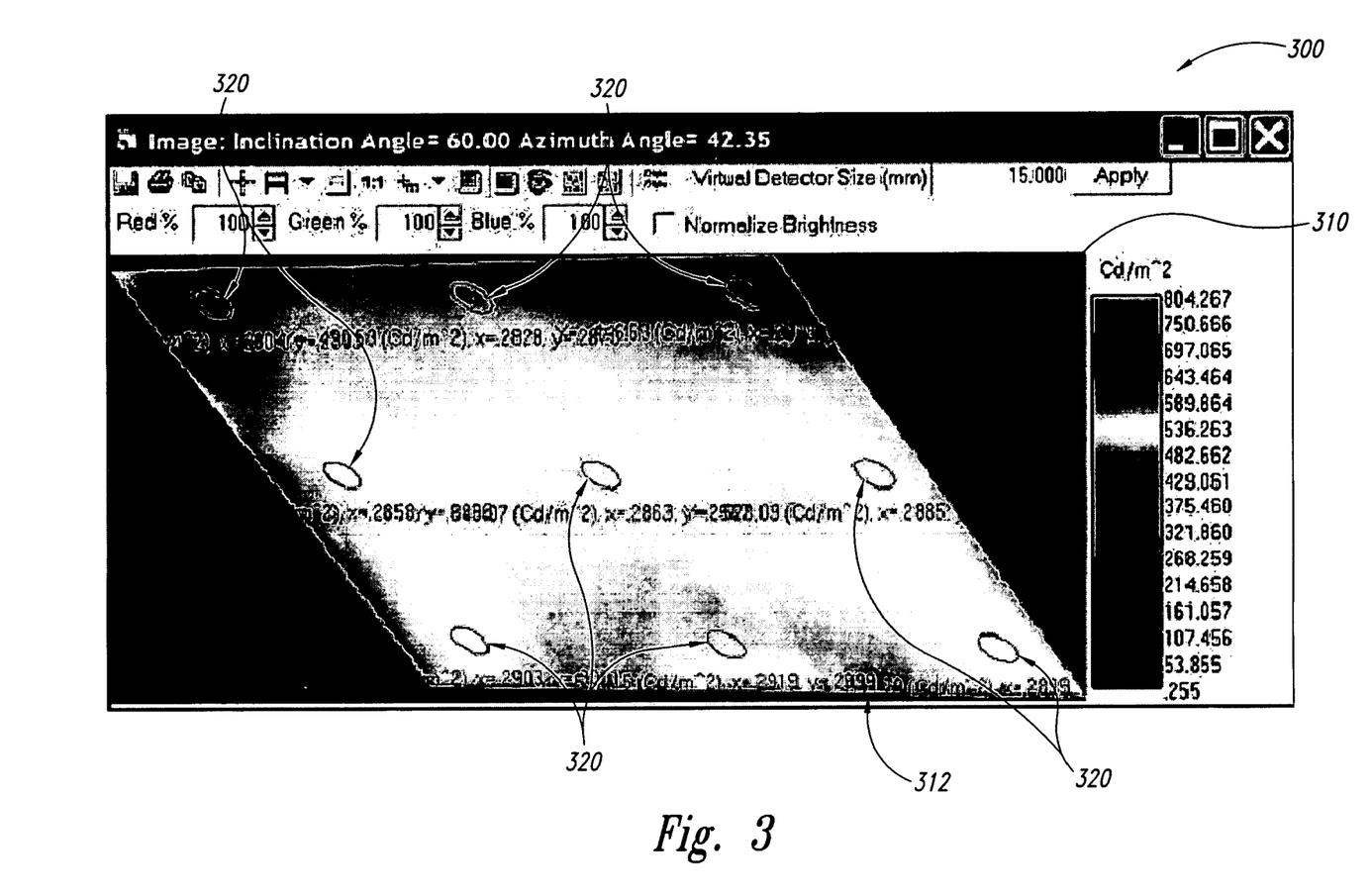
FIG. 3 is a display diagram or screenshot of a stage in the method of FIG. 2 for measuring the spatial and angular performance of a visual display in accordance with an embodiment of the invention.

Referring to FIG. 2, the method 200 includes selecting one or more points of interest on the visual display at stage 230. In one embodiment, for example, this stage includes creating a list of arcuate or circular points of interest having a defined radius. These points of interest are locations on the display to calculate angular information from the measurements of stage 220. FIG. 3, for example, is a display diagram or screen shot of a point selection page 300 in accordance with an embodiment of stage 230. The point selection page 300 can be part of the image software within the controller 140 (FIG. 1A). The page 300 includes a view window 310 illustrating an image measurement 312 from the visual display under test (e.g., the visual display 120). A user (not shown) can select one or more points of interest 320 within the image measurement 312, and brightness and color data (i.e., luminance $L_v$ and chromaticity coordinates ($C_x$, $C_y$) can be displayed for each point of interest. The selected points usually define a grid. In the illustrated embodiment, for example, the user has selected nine different points of interest (e.g., the VESA 9 points). In other embodiments, however, the user can select a different number of points, the points have a different configuration, and/or the points can have a different arrangement relative to each other.

One particular feature of this embodiment is that the selected points of interest can accurately rotate with the visual display. The points 320 illustrated in FIG. 3, for example, are generally elliptical because the visual display has been rotated to an inclination angle Θ of 60.0° and an azimuth angle Φ of 42.35°. The view angle performance data, however, remains accurate throughout the rotation. In contrast, conventional methods for measuring view angle performance using spectroradiometers or other types of spot meters require the display to be generally normal to the spot meter for accurate measurements. If the display is rotated such that one or more points are not normal to the spot meter, the measurements from the spot meter are inaccurate because the spot meter gets light from a much larger area on the display than the selected point of interest.

Referring back to FIG. 2, the method 200 continues at stage 240 by calculating tristimulus values (X, Y, Z) for each point of interest at each view angle (as measured by the camera). In one embodiment, for example, this process includes calculating a location, a size, and a shape of each point of interest for each measurement image at each view angle. More specifically, for each view angle (i.e., goniometer position), stage 240 includes calculating a rotation matrix that transforms any point of interest from its position in the normal view (e.g., "straight-on" view when the goniometer is in the (zero, zero) position) to a new position after the goniometer has undergone a rotation of H, V). This matrix will be the product of the rotation matrices of the two goniometer axes. The order of the multiplication depends on the goniometer configuration (e.g., East Polar or North Polar).

Next, for each point of interest at each view angle, this stage includes finding the CCD pixels enclosed by each point of interest in the normal view and, for each pixel found, determining its (x, y, z) position relative to the goniometer rotation center. The process then includes transforming this position vector using the rotation matrices described above and, subsequently, projecting the new position vector from the camera location into the view plane normal to the camera through the rotation center. Accordingly, this new position is the location of the particular CCD pixel in the measured image at the given view angle. This process can be repeated for each of the desired pixels.

The transformed pixel locations are generally non-integer values because they result from a series of calculations. Accordingly, stage 240 of the method 200 can further include determining the pixel gray value at each transform location by interpolating the measurement image. A bilinear interpolation is generally sufficient. In general, there will be three images—one image captured through each of the three CIE (Commission Internationale de l'Eclairage) color matching filters of the camera. The pixel gray value for each of these images is interpolated. More specifically, stage 240 continues by computing the average pixel gray values for each filter for all pixels enclosed in the point of interest. These values are referred to herein as R, G, and B. The individual (R, G, B) values are converted to tristimulus values (X, Y, Z) by multiplying the (R, G, B) vector by a color calibration matrix. This matrix is generally a preconfigured matrix specifically selected based on the particular set of color matching filters and camera. The tristimulus values (X, Y, Z) values for each point of interest and for each measurement angle can then be stored in a database or other file. One feature of the method 200 is that the above-described calculations only need to be done once (unless a new set of points of interest is desired). An advantage of this feature is that it can provide a significant time savings when creating the various plots of the view angle data, as described in greater detail below.

At stage 250, the method 200 continues by generating one or more view angle performance charts for the user-selected points of interest. More specifically, this stage of the method 200 includes creating view angle performance radar plots (with spherical coordinates) at one or more user-selected points of interest by interpolating the table of (X, Y, Z) values generated in stage 240. This process begins by building a regular 2-D grid of values for each of X, Y, and Z. The horizontal grid dimension is the azimuth view angle Φ and the vertical grid dimension is the inclination view angle Θ. These grids are constructed by interpolating all the values in the (X, Y, Z) table for the given point(s) of interest. Because the angular step size of the measurement images may be large (e.g., greater than one degree), a bi-cubic interpolation method can be used. The grids are generally constructed at the smallest step size evident in the recorded data.

The constructed grids are then interpolated down to a finer or smaller step size (e.g., one degree) using a bi-cubic interpolation method or another suitable interpolation method. Although the grid data can now be plotted to a standard radar plot if desired, this data does not represent the industry standard of measuring the view angle performance for a given point of interest relative to the normal direction. More specifically, the problem is that for all points except the point directly in front of the camera, the camera makes an additional angle to the point of interest. This angle should generally be removed before presenting the data.

Accordingly, stage 250 can continue by constructing new grids that correct for the camera angle by interpolating the uncorrected grids. More specifically, for each element (i.e., a certain azimuth view angle Φ and inclination view angle Θ) in the corrected grid, the method 200 can include constructing a vector originating from the point of interest and pointing in the direction of the view angle (given by the azimuth Φ and inclination Θ angles). The method continues by determining the intersection point of this vector and a sphere centered on the goniometer rotation center with a radius of the camera-to-display distance. The method then includes computing the direction cosines of a vector pointing from the origin (goniometer rotation center) to the intersection point found previously, and converting these direction cosines into the spherical angles (new azimuth Φ and inclination Θ angles). Next, the method includes interpolating the uncorrected grids at these new azimuth Φ and inclination Θ angles. A bi-linear interpolation is generally sufficient. The newly corrected grids can then be plotted in a standard radar-plot form and the plot will now represent the view angle performance relative to the normal direction.

Figure 4A:
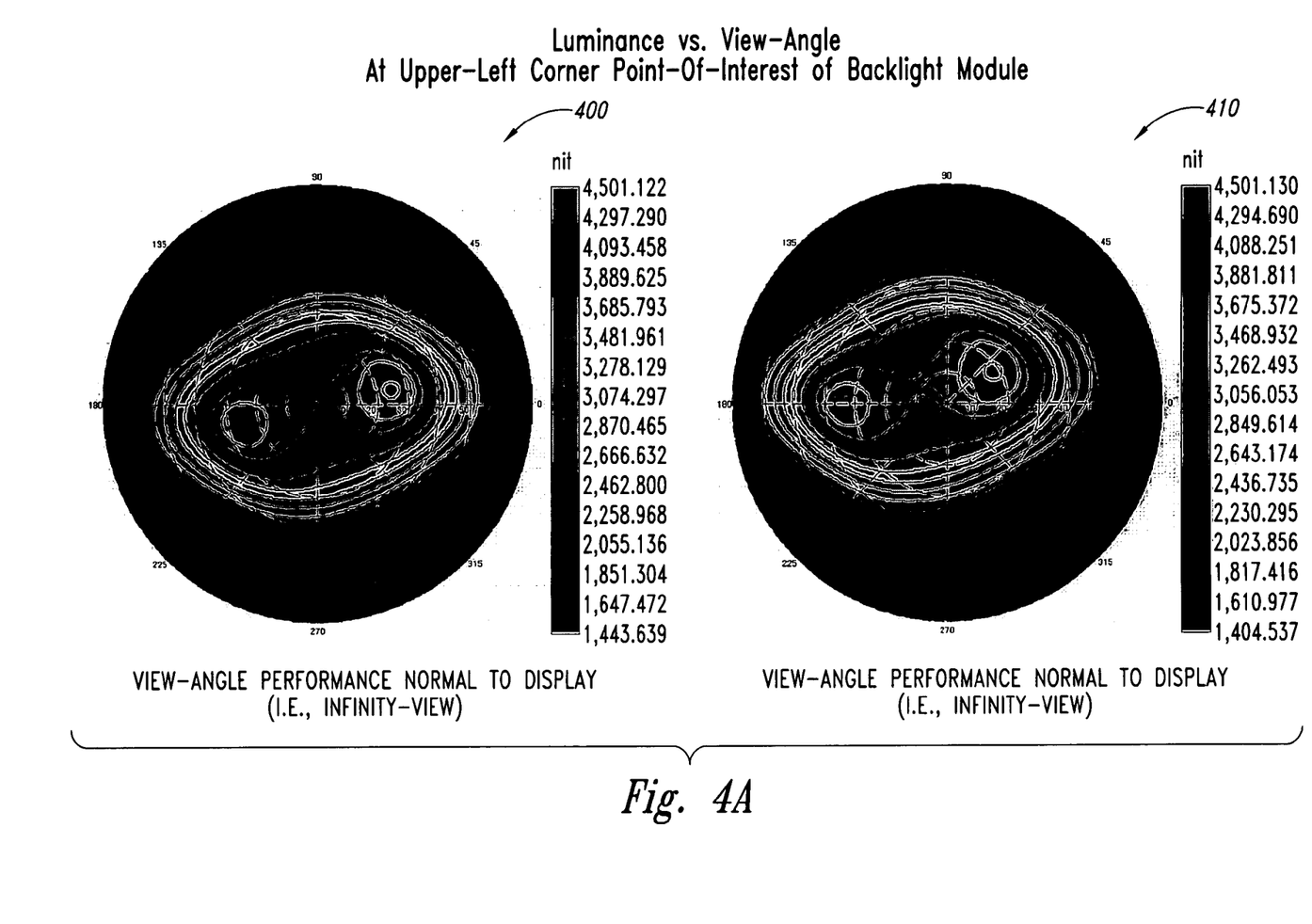
FIGS. 4A-4C are display diagrams or screen shots of view angle performance radar-plots generated using the method of FIG. 2.
Figure 4B:
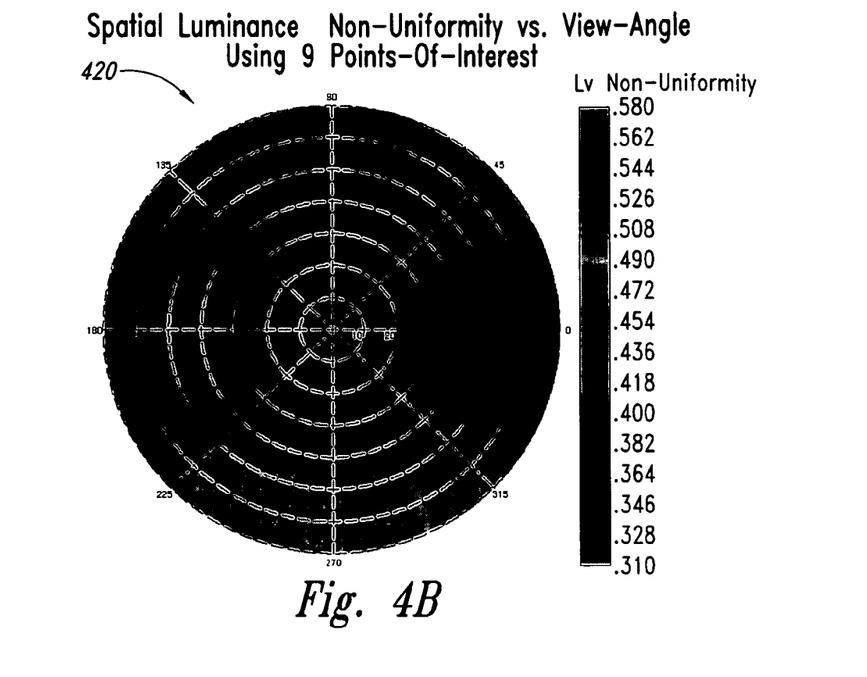
Figure 4C:
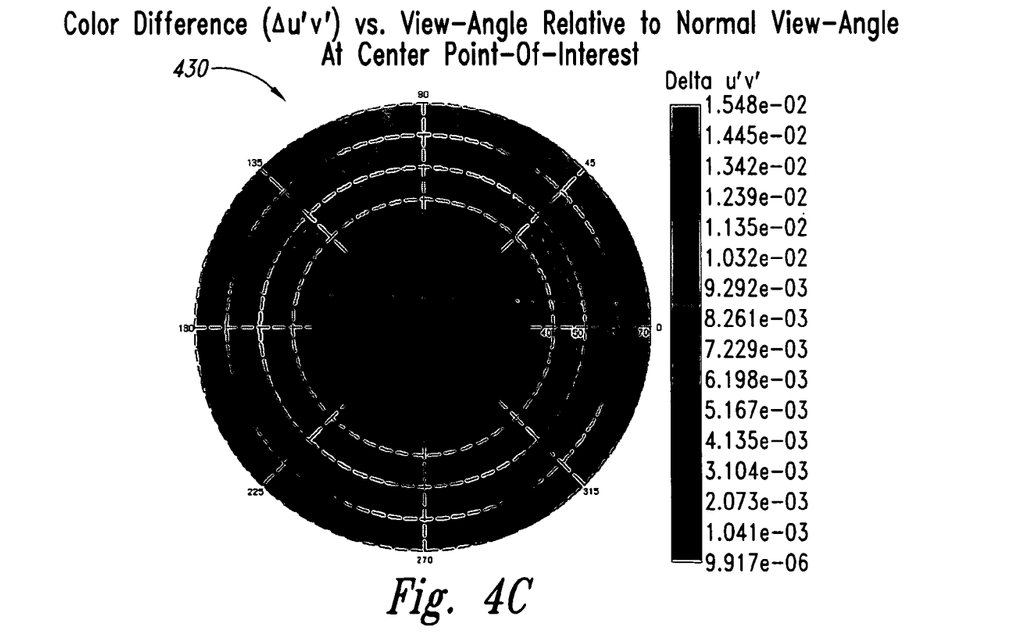

A variety of different view angle performance charts can be generated using the methods described above. FIGS. 4A-4C, for example, are display diagrams or screen shots of view angle performance radar plots generated in accordance with several embodiments of stage 250 of the method 200 described above. FIG. 4A, for example, illustrates a first radar-plot 400 and a second radar plot 410 of luminance versus view-angle at a user selected point-of-interest in an upper-left corner of a backlight module. The first radar-plot 400 includes view-angle performance at "infinity" view (i.e., the display generally normal to the camera), while the second radar-plot 410 includes view-angle performance at "camera-view" (i.e., the display at an angle relative to the camera rather than normal to the camera). Although the first and second radar-plots 400 and 410 are directed to the same point-of-interest on the backlight module, the radar-plots are different due to the different angles the camera makes with the point-of-interest. FIG. 4B illustrates a view angle performance radar-plot 420 with spatial luminance non-uniformity versus view-angle using nine points-of-interest on a display. The radar-plot 420 includes both spatial and angular information in a single plot. FIG. 4C is a view angle performance radar-plot 430 with color difference (Δu'v') versus view-angle performance relative a normal view-angle at a center point-of-interest. The radar-plot 230 includes data for one spatial point at all angles. In other embodiments, a variety of different view angle performance plots in addition to, or in lieu of, the radar-plots shown in FIGS. 4A-4C can be generated.

One feature of embodiments of the invention described above with reference to FIGS. 1A-4C is the ability to give performance results (e.g., luminance, color, spatial uniformity versus view angle, etc.) at either the measurement distance or at infinity. The results can also be provided at any other distance in between. An advantage of this feature is that it can provide measurements at both (a) a finite user-distance, such as at viewing distances that a user would experience in his or her family room, and/or (b) at "infinity" in which the measurements are perpendicular or normal to the display, which is a more traditional measurement for visual displays.

Another feature of embodiments of the invention described above in FIGS. 1A-4C is the ability to measure the total light (i.e., the total luminous flux) coming out of the visual display under test without approximation. As discussed previously, it would be impracticable to measure every point on a visual display with a spectroradiometer or spot meter to obtain view angle performance across the entire display. Instead, only a few points across the display are selected for the "spot" measurements. Conversely, embodiments of the system 100 and method 200 described above can provide view-angle performance for every point on the visual display at any desired view angle.

From the foregoing, it will be appreciated that specific embodiments of the invention have been described herein for purposes of illustration, but that various modifications may be made without deviating from the invention. For example, the systems and methods described above can be used to measure a number of different light sources in addition to flat panel visual displays. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

The invention claimed is:

1. A system for measuring spatial and angular performance of a flat panel visual display, the system comprising:
   a camera;
   a flat panel visual display positioned relative to the camera for measurement;
   a display support assembly carrying the visual display and configured to rotatably move the visual display relative to the camera; and
   a controller operably coupled to the camera and the display support assembly, the controller having a non-transitory computer-readable medium containing instructions that, when executed by a computer, perform operations comprising
      capturing a plurality of image measurements from the visual display at a plurality of different view angles with the camera;
      creating a list of user-selected points of interest on the visual display;
      using image data from the plurality of image measurements of the visual display at the different view angles, calculating tristimulus values (X, Y, Z) for the individual point of interests at each of the view angles, wherein calculating tristimulus values (X, Y, Z) comprises
         calculating a location, a size, and a shape of each point of interest for the individual image measurements at each view angle, wherein calculating a location, a size, and a shape of each point of interest comprises
            calculating a rotation matrix to transform each point of interest from a first coordinate in a first initial position to a second coordinate in a second location after the visual display has rotated to a different view angle; and
            determining the pixels enclosed by each point of interest at each view angle in the first position and, for each pixel
               determining a (x, y, z) position vector relative to a center of rotation of the visual display;
               transforming the (x, y, z) position vector of each pixel using the rotation matrix; and
               projecting the transformed (x, y, z) position vector from the camera location into a view plane normal to the camera and through the center of rotation of the visual display;
         calculating the average pixel gray values (R, G, B) for the pixels in each point of interest; and
         converting the (R, G, B) values to tristimulus values (X, Y, Z) using a color calibration matrix; and
      generating one or more a view angle performance charts for the selected points of interest.

2. The system of claim 1 wherein the camera is an imaging photometer having a CCD or CMOS image sensor.

3. The system of claim 1 wherein the display support assembly is a goniometer configured to rotatably move the visual display about a horizontal axis and a vertical axis generally transverse to the horizontal axis.

4. The system of claim 3 wherein the goniometer has an east polar configuration.

5. The system of claim 1 wherein the camera is generally stationary and is positioned to capture a plurality of image measurements of the visual display at a plurality of different view angles as the visual display moves relative to the camera, and wherein the individual image measurements include a measurement of all or generally all of the visual display.

6. A non-transitory computer-readable medium containing instructions that, when executed, cause one or more computer systems to measure spatial and angular performance of a flat panel video display by performing a method, the method comprising:
   acquiring image measurements of the visual display at multiple view angles with an imaging photometer;
   storing user-selected points of interest on the visual display;
   using image data from the image measurements of the visual display at the multiple view angles, calculating tristimulus values (X, Y, Z) for the individual user-selected point of interests at each of the view angles by
      calculating a location, a size, and a shape of each user-selected point of interest for the individual image measurements at each view angle, wherein calculating a location, a size, and a shape of each point of interest comprises
         calculating a rotation matrix to transform each point of interest from a first coordinate in a first initial position to a second coordinate in a second location after the visual display has rotated to a different view angle; and
         determining the pixels enclosed by each point of interest at each view angle in the first position and, for each pixel
            determining a (x, y, z) position vector relative to a center of rotation of the visual display;
            transforming the (x, y, z) position vector of each pixel using the rotation matrix; and
            projecting the transformed (x, y, z) position vector from the camera location into a view plane normal to the camera and through the center of rotation of the visual display;
      calculating an average pixel gray values (R, G, B) for the pixels in each point of interest; and
      converting the (R, G, B) values to tristimulus values (X, Y, Z) using a color calibration matrix; and
   creating a view angle performance radar-plot at one or more of the user-selected points of interest.

7. The method of claim 6 wherein creating a view angle performance radar-plot comprises creating a radar-plot having brightness, color, and/or uniformity characterizations of the visual display as a function of view angle at all display locations.

8. The method of claim 6 wherein creating a view angle performance radar-plot comprises creating a radar-plot having brightness, color, and/or uniformity characterizations of each point on the visual display without approximation.

9. The method of claim 6 wherein storing a list of user-selected points of interest comprises storing a list of generally arcuate points of interest having a defined radius.

10. The method of claim 6 wherein acquiring images of the visual display at multiple view angles comprises (a) selecting a desired step size, and (b) stepping the visual display about both a horizontal axis and a vertical axis and capturing image measurements of the visual display at the individual step locations.

11. One or more computer memories collectively containing a data structure representing spatial and angular performance of a flat panel visual display, the data structure comprising a plurality of image measurements of the visual display at a plurality of different view angles, a list of user-selected points of interest on the visual display, tristimulus values (X, Y, Z) for each of the user-selected points of interest at each of the view angles calculated, at least in part, using image data from the plurality of image measurements of the visual display at the different view angles, interpolated tristimulus values (X, Y, Z) for each of the user-selected points of interest to correct for camera angle to the respective points of interest,
   wherein calculating tristimulus values (X, Y, Z) for the individual user-selected point of interests at each of the view angles comprises
      calculating a location, a size, and a shape of each user-selected point of interest for the individual image measurements at each view angle, wherein calculating a location, a size, and a shape of each point of interest comprises
         calculating a rotation matrix to transform each point of interest from a first coordinate in a first initial position to a second coordinate in a second location after the visual display has rotated to a different view angle, and
         determining the pixels enclosed by each point of interest at each view angle in the first position and, for each pixel
            determining a (x, y, z) position vector relative to a center of rotation of the visual display,
            transforming the (x, y, z) position vector of each pixel using the rotation matrix, and
            projecting the transformed (x, y, z) position vector from the camera location into a view plane normal to the camera and through the center of rotation of the visual display,
      calculating an average pixel gray values (R, G, B) for the pixels in each point of interest, and
      converting the (R, G, B) values to tristimulus values (X, Y, Z) using a color calibration matrix.

12. A method for measuring spatial and angular performance of a flat panel visual display, the method comprising:
   capturing a plurality of image measurements from a visual display at a plurality of different view angles, wherein the visual display is supported by a goniometer and the image measurements are captured by a camera positioned relative to the visual display and goniometer;
   selecting one or more points of interest on the visual display;
   calculating tristimulus values (X, Y, Z) for each point of interest at each of the plurality of view angles, wherein calculating tristimulus values (X, Y, Z) for each point of interest comprises
      calculating a location, a size, and a shape of each point of interest for the individual image measurements at each view angle, wherein calculating the location, the size, and the shape of each point comprises
         calculating a rotation matrix to transform each point of interest from a first coordinate in a first initial position to a second coordinate in a second location after the visual display has rotated to a different view angle; and
         determining the pixels enclosed by each point of interest at each view angle in the first position and, for each pixel determining a (x, y, z) position vector relative to a center of the goniometer rotation;

transforming the (x, y, z) position vector of each pixel using the rotation matrix; and projecting the transformed (x, y, z) position vector from the camera location into a view plane normal to the camera and through the center of the goniometer rotation;

calculating the average pixel gray values (R, G, B) for the pixels in each point of interest; and converting the (R, G, B) values to tristimulus values (X, Y, Z) using a color calibration matrix; and generating a view angle performance plot for the one or more selected points of interest.

13. The method of claim 12 wherein selecting one or more points of interest on the visual display comprises selecting one or more generally arcuate points of interest having a defined radius.

14. The method of claim 12 wherein generating a view angle performance plot for the one or more selected points of interest comprises generating view angle performance radar-plots at a measurement distance or at normal.

15. The method of claim 12 wherein generating a view angle performance plot for the one or more selected points of interest comprises interpolating the (X, Y, Z) values for the one or more points of interest at each of the plurality of view angles.

16. The method of claim 12 wherein generating a view angle performance plot for the one or more selected points of interest comprises generating a view angle performance radar-plot of spatial uniformity as a function of view angle for the visual display.

17. The method of claim 12 wherein generating a view angle performance plot for the one or more selected points of interest comprises:
(a) generating a two-dimensional grid of test values for the individual (X, Y, Z) values;
(b) interpolating the grid of test values from a first step size to a second smaller step size;
(c) interpolating the grid of test values from step (b) to correct for camera angle such that view angle performance for the individual points of interest will be relative to a direction normal to the visual display; and
(c) plotting the grid of test values from step (c) in a radar-plot to present brightness and/or color data for the one or more points of interest.

18. The method of claim 12 wherein capturing a plurality of image measurements from a visual display comprises capturing the image measurements using an imaging photometer, and wherein the method further comprises:

aligning the imaging photometer and the visual display relative to each other before capturing the image measurements.

19. The method of claim 18 wherein aligning the imaging photometer and the visual display relative to each other comprises:

directing the imaging photometer at a center of the goniometer rotation;

aligning the visual display normal to the imaging photometer; and recording the distance from the imaging photometer to the center of the goniometer rotation, the distance from the visual display surface to the center of the goniometer rotation, and the size of the visual display.

* * * * *

UNITED STATES PATENT AND TRADEMARK OFFICE
CERTIFICATE OF CORRECTION

| | | |
|---|---|---|
| PATENT NO. | : 7,995,098 B2 | |
| APPLICATION NO. | : 11/519546 | |
| DATED | : August 9, 2011 | |
| INVENTOR(S) | : Gary Robert Pedeville et al. | |

It is certified that error appears in the above-identified patent and that said Letters Patent is hereby corrected as shown below:

In column 3, line 32, delete "calorimeters," and insert -- colorimeters, --, therefor.

In column 12, line 12, in claim 17, delete "(c)" and insert -- (d) --, therefor.

Signed and Sealed this
Twenty-seventh Day of December, 2011

David J. Kappos
*Director of the United States Patent and Trademark Office*